United States Patent [19]

Ogasawara et al.

[11] 4,330,643

[45] May 18, 1982

[54] PROCESS FOR PRODUCTION OF ACRYLOYLOXY- OR METHACRYLOYLOXY-TERMINATED POLYESTERS

[75] Inventors: Takahisa Ogasawara; Kiyokazu Mizutani, both of Nagoya, Japan

[73] Assignee: Toagosei Chemical Industry Co., Ltd., Tokyo, Japan

[21] Appl. No.: 237,054

[22] Filed: Feb. 23, 1981

[30] Foreign Application Priority Data

Feb. 22, 1980 [JP] Japan .................................. 55-20401

[51] Int. Cl.³ .............................................. C08G 63/18
[52] U.S. Cl. ..................................... 525/445; 528/301; 528/304
[58] Field of Search ................. 525/445; 528/301, 304

[56] References Cited

U.S. PATENT DOCUMENTS 3,455,802 7/1969 D'Alelio .............................. 528/304

*Primary Examiner*—Maurice J. Welsh
*Attorney, Agent, or Firm*—Sughrue, Mion, Zinn, Macpeak and Seas

[57] ABSTRACT

A process for production of an acryloyloxy- or methacryloyloxy-terminated polyester is described, which comprises reacting a specific hydroxy-terminated polyester with acrylic acid or methacrylic acid, wherein the hydroxy-terminated polyester comprises (a) a dicarboxylic acid unit comprising about 10 to about 80 mol % of a terephthalic acid unit and about 90 to about 20 mol % of another dicarboxylic acid unit and (b) a dihydric alcohol unit containing about 30 mol % or more of a dihydric alcohol unit containing 3 or more carbon atoms and having a number average molecular weight of about 400 to about 5,000.

6 Claims, No Drawings

PROCESS FOR PRODUCTION OF ACRYLOYLOXY- OR METHACRYLOYLOXY-TERMINATED POLYESTERS

FIELD OF THE INVENTION

This invention relates to a process for production of acryloyloxy- or methacryloyloxy-terminated polyesters and, more particularly, to a process for producing acryloyloxy- or methacryloyloxy-terminated polyesters by reacting hydroxy-terminated polyesters comprising a dicarboxylic acid unit containing therein a terephthalic acid unit and a dihydric alcohol unit containing therein a dihydric alcohol unit having 3 or more carbon atoms with acrylic acid or methacrylic acid.

BACKGROUND OF THE INVENTION

The terms "acrylic acid", "acrylate" and "acryloyloxy" are used hereinafter in this specification to mean both acrylic acid and methacrylic acid, acrylate and methacrylate, and acryloyloxy and methacryloyloxy, respectively.

A large number of acryloyloxy-terminated polyesters (also called polyester acrylates) are known wherein the polybasic acid unit and polyhydric alcohol unit constituting the polyester portion are varied. For example, crystalline acryloyloxy-terminated polyesters containing the condensate of terephthalic acid and ethylene glycol as a polyester-forming unit are known. These polyesters, however, cannot be used as a material for a liquid and non-solvent type of paint or ink because they have high melting points and are almost insoluble in monomers, oligomers and solvents generally used.

Other known polymerizable acrylates include acryloyloxy-terminated polyurethanes (also called urethane acrylates) and acryloyloxy-terminated epoxyesters (also called epoxy acrylates). It is known that these polymerizable acrylates can be used as paints or inks capable of being cured by heating or by irradiating with ultraviolet light.

Paints or inks prepared using these conventional polymerizable acrylates, however, do not have sufficient adhesion to metals, particularly tin-free steel ("TFS" for brevity) and tinplate. In applications, therefore, where post-working such as pressing, bending and squeezing is needed after the coating or printing of the paint or ink, or where the coating or printing is applied directly onto the TFS or tinplate, their performance is not sufficient. Their usefulness is thus limited in such applications.

In order to improve such poor adhesion to metals, various attempts have been made as to the resin composition per se, e.g., the structure of polymerizable acrylates and compounding technique, metal surface treating technique, and curing technique.

With regard to the resin composition, an attempt to incorporate compounds reactive with the metal surface (e.g., a silane coupling agent, a titanate coupling agent, a polyisocyanate compound and an epoxy compound), an attempt to use acrylates containing therein a phosphoric acid ester group or a carboxy group, or to introduce such functional groups into the molecular skeleton of the resin, an attempt to incorporate a surface active agent, and so forth have been made, but these approaches have failed to improve the poor adhesion to the extent that the adhesion is sufficient.

Metal surface treating techniques which have been proposed to improve the poor adhesion include chemical treatment (e.g., a phosphate treatment), an alumite treatment, a primer treatment using a silane coupling agent or a titanate coupling agent, an undercoating treatment using conventional solvent type thermosetting resins or thermoplastic resins, a primer coating treatment, and a surface coarsening treatment, e.g., partial etching of the metal surface and sand blasting. In many cases, the adhesion of the coating film to substrates subjected to these surface treatments is increased, but the improvement is not sufficient in those applications where post-working as described hereinbefore is required. These techniques, however, are not suitable for general use because special treatments are required and multiple coating is involved; that is, they are disadvantageous in both workability and economical efficiency. The primer treatments and undercoating treatments are also disadvantageous in that long periods of time are required to dry the solvent, for post-treatment and for curing and furthermore a large quantity of heat is needed. Furthermore, it is difficult to employ such treatments in the coating or printing line where an ultraviolet light-curable pigment or ink, which has a fast curing rate and needs no heating, is used.

Attempts made to improve the poor adhesion with respect to the curing technique include a method in which coating or printing is carried out while heating the substrate and a method in which heating is applied after the coating. These methods fail to increase the adhesion of the coating film to a sufficient extent and furthermore are not preferred in that a large quantity of heat is needed for heating a substrate having a high heat capacity, such as a metal.

SUMMARY OF THE INVENTION

An object of this invention is to provide a process for the production of an acryloyloxy-terminated polyester which is easily curable on application of a curing means, such as irradiation with ultraviolet light and heating, and which is capable of providing a cured coating film having excellent adhesion to a substrate and working characteristics which could not be expected from conventional processes.

Another object of this invention is to provide a process for production of an acryloyloxy-terminated polyester which when used, for example, as a paint or ink of the type curable on irradiation with ultraviolet light, is liquid and easy to handle, and which has excellent compatibility with other polymerizable oligomers and monomers, thermoplastic polymers, and additives such as pigments, so that adjustment in viscosity, various modifications and improvements in the physical properties of a cured product can be achieved easily.

A further object of this invention is to provide a process for production of an acryloyloxy-terminated polyester which is capable of providing a cured product which can be formed into a film having good elongation and toughness, and where the cured product has excellent physical properties such as chemical resistance, heat resistance, and weather resistance.

As a result of extensive investigations to overcome the problems in the prior art described above and to provide a polymerizable acrylate which can be directly coated or printed even onto tinplate or TFS (tin-free steel) to which conventional ultraviolet light-curable paints or inks almost could not be bonded, and which exhibits excellent physical properties as a coating film in applications where post-workability is required, this invention has been completed.

This invention, therefore, provides a process for the production of an acryloyloxy-terminated polyester which comprises reacting a hydroxy-terminated polyester having a number average molecular weight of about 400 to about 5,000, the polyester comprising (a) a dicarboxylic acid unit comprising about 10 to about 80 mol% of a terephthalic acid unit and about 90 to about 20 mol% of another dicarboxylic acid unit and (b) a dihydric alcohol unit containing about 30 mol% or more of a dihydric alcohol unit containing 3 or more carbon atoms, with an acrylic acid selected from the group consisting of acrylic acid and methacrylic acid.

DETAILED DESCRIPTION OF THE INVENTION

The acryloyloxy-terminated polyester of this invention can be prepared by reacting a hydroxy-terminated polyester with a specific structure with acrylic acid to convert the hydroxy group into an acrylate.

The hydroxy-terminated polyester as used herein comprises:

(1) a dicarboxylic acid unit containing about 10 to about 80 mol% of a terephthalic acid unit and a dihydric alcohol unit containing about 30 mol% or more of a dihydric alcohol unit containing 3 or more carbon atoms;

(2) preferably, a dicarboxylic acid unit comprising about 10 to about 80 mol% of a terephthalic acid unit, about 10 to about 80 mol% of an isophthalic acid and/or a saturated dicarboxylic acid unit containing 4 or more carbon atoms (including the carbon atoms in the carboxyl groups thereof), and 0 to about 50 mol% of another dicarboxylic acid unit, and a dihydric alcohol unit containing about 30 mol% or more of a dihydric alcohol unit containing 3 or more carbon atoms; and (3) more preferably, a dicarboxylic acid unit comprising about 10 to about 80 mol% of a terephthalic acid unit, about 10 to about 80 mol% of an isophthalic acid unit and a saturated dicarboxylic acid unit containing 4 or more carbon atoms, and 0 to about 50 mol% of another dicarboxylic acid unit wherein the molar ratio of the isophthalic acid unit to the terephthalic acid unit is from about 0.3:1 to about 3:1 and the molar ratio of the saturated dicarboxylic acid unit containing 4 or more carbon atoms to the total amount of the terephthalic acid unit and the isophthalic acid unit is from about 1/9:1 to about 1:1, and a dihydric alcohol unit containing about 30 mol% or more of a dihydric alcohol unit containing 3 or more carbon atoms.

The molecular weight of each of these hydroxy-terminated polyesters (all molecular weights as used in this specification are number average molecular weight) is from about 400 to about 5,000 and preferably is from about 500 to about 2,000. When the molecular weight is too small, the acryloyloxy-terminated polyester obtained provides a cured product having low flexibility and low adhesion to a substrate, whereas when the molecular weight is too large, the acryloyloxy-terminated polyester obtained has an extremely high viscosity or is solid and its curing rate is lowered.

Of those units forming the polyester, the terephthalic acid unit most greatly contributes to the characteristics of the acryloyloxy-terminated polyester and the physical properties of the cured product. When the proportion of the terephthalic acid unit is too large, the acryloyloxy-terminated polyester obtained is in a crystalline form and is not compatible with other monomers or oligomers and, therefore, it cannot be used as a material for a non-solvent type of paint or ink. Additionally, the cured coating film is subject to whitening and a transparent and uniform coating cannot be obtained. On the other hand, when the proportion of the terephthalic acid unit is too small, the polyester obtained provides a cured product having lowered strength, elongation, flexibility, hardness, chemical resistance and adhesion to a substrate. Therefore, the terephthalic acid unit constitutes about 10 to about 80 mol% of the dicarboxylic acid unit.

Similarly, the dihydric alcohol unit is an important factor affecting the characteristics of the acryloyloxy-terminated polyester and the physical properties of the cured product. When the unit of ethylene glycol (number of carbon atoms: 2), which is believed to provide a high molecular weight saturated polyester having the best physical properties, is present in an excessive amount, the acryloyloxy-terminated polyester is not liquid, but is a solid in a crystalline form and, furthermore, the compatibility of the acryloyloxy-terminated polyester with other oligomers or monomers is lowered. Therefore, the dihydric alcohol unit containing 3 or more carbon atoms, preferably up to 100 carbon atoms, constitutes about 30 mol% or more of the dihydric alcohol unit and it is more desirable that it constitutes about 50 mol% or more of the dihydric alcohol unit.

Another factor affecting the characteristics of the acryloyloxy-terminated polyester and the physical properties of the cured product is the other dicarboxylic acid units which are used in combination with the terephthalic acid unit. The most suitable dicarboxylic acid units to be used in combination with the terephthalic acid unit are an isophthalic acid unit and a saturated dicarboxylic acid unit containing 4 or more carbon atoms.

The isophthalic acid unit compensates for decreases in the strength, hardness, chemical resistance and adhesion to a substrate of the cured product resulting from a decrease in the terephthalic acid unit content, permits a liquid acryloyloxy-terminated polyester to be obtained and increases the compatibility of the acryloyloxy-terminated polyester with other monomers and oligomers. The saturated dicarboxylic acid unit containing 4 or more carbon atoms contributes to the formation of a liquid acryloyloxy-terminated polyester, an increase in the compatability with other oligomers and monomers, and furthermore to the formation of a cured product having good elongation and flexibility.

Introduction of the isophthalic acid unit or dicarboxylic acid unit containing 4 or more carbon atoms is useful in that acryloyloxy-terminated polyesters having various characteristics can be produced and the performance of the cured product is changed. For this reason, it is more desirable for both the isophthalic acid unit and the saturated dicarboxylic acid unit containing 4 or more carbon atoms to be introduced. It is desirable for the isophthalic acid unit and/or the saturated dicarboxylic acid unit containing 4 or more carbon atoms to constitute about 10 to about 80 mol% of the dicarboxylic acid unit in order to utilize the inherent characteristics of the terephthalic acid unit which is an essential dicarboxylic acid unit.

Other dicarboxylic acid units (e.g., a maleic acid unit, a fumaric acid unit, a phthalic acid unit, etc.) do not exert any great influence on the characteristics of the acryloyloxy-terminated polyester obtained and the physical properties of the cured product; are so to speak inert dicarboxylic acid units and, in some cases, exert slightly adverse influences on some of the physical properties of the cured product, such as strength, elongation, chemical resistance, weather resistance and flexibility. Therefore, there are no special reasons to incorporate these units, but they can be introduced for the purpose of decreasing the cost of the acryloyloxy-terminated polyester, if desired. In this case, it is desirable to incorporate them in an amount of about 50 mol% or less of the dicarboxylic acid unit.

Where the dicarboxylic acid unit consists of the terephthalic acid unit, the isophthalic acid unit and the saturated dicarboxylic acid unit containing 4 or more carbon atoms, it is particularly preferred for the molar ratio of the isophthalic acid unit to the terephthalic acid unit to be about 0.3:1 to about 3:1 and that the molar ratio of the saturated dicarboxylic acid unit containing 4 or more carbon atoms to the total amount of the terephthalic acid unit and the isophthalic acid unit is about 1/9:1 to about 1:1.

When the proportion of the saturated dicarboxylic acid group containing 4 or more carbon atoms is too large, the strength and hardness of the cured product are lowered, and it is therefore preferred for the molar ratio of the saturated dicarboxylic acid unit containing 4 or more carbon atoms to the total amount of the terephthalic acid unit and the isophthalic acid unit be about 1 or less.

Where the saturated dicarboxylic acid unit containing 4 or more carbon atoms is not used or is used in a small amount, it is preferred for those dihydric alcohols containing 3 or more carbon atoms as hereinafter described, dihydric alcohol units having large numbers of carbon atoms, such as those units resulting from long chain glycols, e.g., polyethylene glycol, polypropylene glycol and polytetramethylene glycol, to be introduced in order to provide a liquid acryloyloxy-terminated polyester which is compatible and is capable of providing a cured product with flexibility and elongation.

The hydroxy-terminated polyester as used in this invention can be prepared easily from an acid and an alcohol corresponding, respectively, to the dicarboxylic acid unit and dihydric alcohol unit constituting the skeleton thereof, using known methods heretofore used in production of conventional saturated polyesters.

The molecular weight of the hydroxy-terminated polyester is controlled in the range of about 400 to about 5,000 by controlling the amount of the dihydric alcohol reacted with the dicarboxylic acid and/or the polycondensation conditions (temperature and time).

Such hydroxy-terminated polyesters can be prepared, for example, by the following methods (i), (ii) and (iii) (see, for example, Japanese Patent Application (OPI) Nos. 92394/75 and 92395/75 (the term "OPI" as used herein refers to a "published unexamined Japanese patent application"):

(i) A predetermined dicarboxylic acid (or a derivative thereof such as a dicarboxylic acid anhydride and a lower alkyl ester, e.g., a dicarboxylic acid dimethyl ester) and a predetermined dihydric alcohol are polycondensed by heating. The ratio of the dicarboxylic acid to the dihydric alcohol charged is determined so that n satisfies the following equation:

$$\overline{Mg} + n(\overline{Ma} + \overline{Mg}) = \text{about } 400 \sim 5,000$$

wherein $\overline{Mg}$ and $\overline{Ma}$ are the average molecular weight of the dihydric alcohol unit (—O—R—O— unit) and the average molecular weight of the dicarboxylic acid unit (—OC—R'—CO— unit), respectively.

The end point of the reaction can be determined by measuring the water (or methanol or the like) resulting from the esterification because water formation ceases at the end point of the reaction.

(ii) A low molecular weight polyester can be prepared from a dicarboxylic acid and a dihydric alcohol, and then polycondensed under reduced pressure while removing the alcohol formed.

The dihydric alcohol is usually charged in a ratio of 2 n mol per n mol of the dicarboxylic acid, and the resulting mixture is heated to form the low molecular weight polyester. The low molecular weight polyester is then polycondensed under reduced pressure while observing the alcohol formed, or measuring the molecular weight of the polyester formed using a suitable analytical method, such as liquid chromatography or titrimetric analysis, or by a combination thereof, so that the polyester formed has a predetermined molecular weight.

(iii) A high molecular weight polyester can be mixed with a predetermined amount of a dihydric alcohol and then depolymerized until it has a predetermined molecular weight. The amount of the dihydric alcohol (n mol) added per mol of the high molecular weight polyester is substantially determined by the following relation:

$$\frac{\overline{Mp} + \overline{Mg}}{n + 1} = \text{about } 400 \sim 5,000$$

wherein $\overline{Mp}$ represents the average molecular weight of the high molecular weight polyester, and $\overline{Mg}$ represents the average molecular weight of the dihydric alcohol.

The end point of the reaction is determined experimentally because it will vary depending on the type and amount of the catalyst used, and the reaction temperature.

In any of the above-described methods, the polycondensation or depolymerization reaction is performed, if desired, in the presence of an esterification or ester exchange catalyst. Catalysts which can be used include metal compounds, such as a zinc compound (e.g., zinc acetate), a titanium compound (e.g., tetraalkyl titanate), a magnesium compound (e.g., magnesium chloride), a manganese compound (e.g., manganese acetate), an antimony compound (e.g., antimony trioxide), and an aluminum compound (e.g., aluminum acetate), p-toluenesulfonic acid, benzenesulfonic acid, naphthalenesulfonic acid, sulfuric acid, and the like.

The amount of the catalyst used is usually from about 0.5 ppm to about 30,000 ppm and preferably from about 1 ppm to about 500 ppm although the amount varies depending on the type of the catalyst used, the reaction temperature, etc.

Where the amount of the catalyst used is too large, it is sometimes necessary to remove residual catalyst after the reaction. On the other hand, where the amount of catalyst is too small, it becomes difficult to carry out the reaction at relatively low temperatures.

The reaction temperature is usually within the range of from about 150° C. to about 250° C.

Generally, the reaction is carried out while introducing an inert gas into the reactor for the purpose of removing the water or alcohol formed, or from the standpoint of safety.

The reaction time is usually within the range of from about 3 hours to about 20 hours although the time varies depending on the type of the catalyst used and the reaction temperature.

The hydroxy-terminated polyester obtained is ordinarily a dihydroxy-terminated polyester, i.e., a polyester having a hydroxy group at the both ends and in some cases, this polyester contains a small amount of a monohydroxy-terminated polyester, i.e., a polyester having a hydroxy group only at one end. In this invention, either of such polyesters can be used. Therefore, if the former dihydroxy-terminated polyester is used as a starting material, a diacryloyloxy-terminated polyester, i.e., a polyester having an acryloyloxy group at both ends thereof, is obtained, whereas if the latter dihydroxy-terminated polyester containing a small amount of monohydroxy-terminated polyester is used as a starting material, the acryloyloxy-terminated polyester obtained will contain a small amount of a monoacryloyloxy-terminated polyester, i.e., a polyester having an acryloyloxy group at one end thereof.

Starting materials for use in the production of the hydroxy-terminated polyester of this invention are described below:

Examples of starting materials which can be used to introduce the terephthalic acid unit include terephthalic acid and derivatives thereof such as the lower alkyl esters thereof (e.g., dimethyl ester, diethyl ester, etc.), the acid halides (e.g., acid chloride, acid bromide, etc.) and the amides (monoamide and diamide).

Examples of starting materials which can be used to introduce the isophthalic acid unit include isophthalic acid and derivatives thereof such as the lower alkyl esters thereof (e.g., dimethyl ester, diethyl ester, etc.), the acid halides (e.g., acid chloride, acid bromide, etc.) and the amides (monoamide and diamide).

Examples of starting materials which can be used to introduce the saturated dicarboxylic acid unit containing 4 or more carbon atoms include succinic acid, glutaric acid, adipic acid, sebacic acid, decanedicarboxylic acid, 1,4-(or 1,3, or 1,2-)cyclohexanedicarboxylic acid, etc., and derivatives thereof such as the acid anhydrides and the lower alkyl esters thereof.

Dihydric alcohols containing 3 or more carbon atoms which can be used include 1,3-(or 1,2-)propylene glycol, 1,4-(or 1,3 or 2,3-)butanediol, 1,6-hexanediol, neopentyl glycol, diethylene glycol, polyethylene glycol, dipropylene glycol, polypropylene glycol, ditetramethylene glycol, polytetramethylene glycol, polyoxyethylenated bisphenol A, polyoxypropylenated bisphenol A, 1,4-dihydroxy-2-ethylbutane, 1,8-dihydroxyoctane, 2,10-dihydroxydecane, 1,4-dihydroxycyclohexane, triethylene glycol, tetraethylene glycol, tripropylene glycol, tetrapropylene glycol, 1,4-dimethylolcyclohexane, 2,2-diethyl-propanediol-1,3, 2,2-dimethyl-propanediol-1,3, 3-methyl-pentanediol-1,4, 2,2-diethyl-butanediol-1,3, 4,5-dihydroxynonane, pentamethylene glycol, heptamethylene glycol, nonamethylene glycol, decamethylene glycol, 2-ethyl-hexanediol-1,3 and the like. So long as the dihydric alcohol unit constitutes about 30 mol% or more of the total alcohol unit, ethylene glycol can be used in combination with the above-described dihydric alcohols containing 3 or more carbon atoms.

The acryloyloxy-terminated polyester of this invention can be prepared by reacting the hydroxy-terminated polyester as described above with acrylic acid to convert the hydroxy group into an acrylate. In this reaction, known techniques used in the production of conventional acryloyloxy-terminated polyesters can be employed. According to a method as described in, for example, Japanese Patent Publication No. 47687/76, predetermined amounts of a hydroxy-terminated polyester and acrylic acid are heated at a temperature of about 125° to 130° C. while introducing an inert gas. In order to increase the conversion in accordance with this method, however, the reaction must be performed for a long period of time. In some cases, this results in polymerization of the acryloyl group. Usually, therefore, a method is employed which comprises performing an esterification in the presence of an azeotropic dehydration solvent, an esterification catalyst, and a polymerization inhibitor at the reflux temperature of the solvent while removing the water formed by the esterification (see, for example, Japanese Patent Publication No. 36956/73 and A. A. Berlin et al., *Polyester Acrylate*, Nauka, Moscow (1967)). The reaction product is then, if desired, subjected to purification processings, such as neutralization, water washing, decoloring and filtration, and on removal of the solvent by distillation, an acryloyloxy-terminated polyester is obtained.

The hydroxy-terminated polyester and acrylic acid are charged in such a ratio that the ratio of carboxyl group to hydroxyl group equivalents is ordinarily from about 0.8 to about 1.5 and preferably is from about 0.9 to about 1.2.

Reaction solvents for azeotropic dehydration which can be used include benzene, toluene, xylene, cyclohexane, n-hexane, and isopropyl ether. The amount of the solvent used is usually within the range of from about ½ to about 5 times the weight of the hydroxy-terminated polyester.

Esterification catalysts which can be used include sulfuric acid, p-toluenesulfonic acid, benzenesulfonic acid, and naphthalenesulfonic acid. The amount of the esterification catalyst is within the range of from about 0.05% by weight to about 5% by weight, preferably from about 0.1% by weight to about 3% by weight, based on the total weight of the hydroxy-terminated polyester and acrylic acid. Where the amount of the catalyst used is too small, a longer period of time is required for the reaction. On the other hand, where the amount of the catalyst is too large, it is sometimes necessary to remove the residual catalyst after the reaction.

Polymerization inhibitors which can be used include hydroquinone, hydroquinone monomethyl ether, phenothiazine, benzoquinone, copper powder, copper salts, and the like. The amount of the polymerization inhibitor used is generally within the range of from about 10 ppm to about 1,000 ppm and preferably within the range of from about 50 ppm to about 500 ppm, based on the total weight of the hydroxy-terminated polyester and acrylic acid. Where the amount of the polymerization inhibitor used is too small, polymerization of the acryloyloxy group sometimes occurs during the course of esterification. On the other hand, where the amount of the polymerization inhibitor is too large, polymerization inhibition sometimes occurs in curing the acryloyloxy-terminated polyester.

The reaction temperature is usually within the range of from about 70° C. to about 130° C. although the temperature varies depending on the type and amount of the azeotropic dehydration solvent used.

The esterification reaction is usually performed at atmospheric pressure. However, when the azeotropic temperature is high, the esterification reaction may be carried out under reduced pressure in order to control the reaction temperature within the above-described range.

The reaction time is preferably within the range of about 10 hours or less although the time varies depending on the type and amount of the catalyst used and the reaction temperature.

The thus-obtained acryloyloxy-terminated polyester of this invention is liquid or in the form of a low melting point wax and has good compatibility with other vinyl monomers, acryloyloxy-terminated oligomers and solvents.

The acryloyloxy-terminated polyester of this invention has a very low viscosity as compared with conventional acryloyloxy-terminated polyurethanes, acryloyloxy-terminated epoxy esters, etc., having nearly the same molecular weight as the acryloyloxy-terminated polyester of this invention, which tend to have an extremely high viscosity or to be solid because of their intermolecular hydrogen bonding. The acryloyloxyterminated polyester of this invention, therefore, can be used alone or in combination with other vinyl monomers, oligomers and, if desired, thermoplastic polymers and various additives, as a liquid material or composition of low viscosity and with good workability which is suitable for use in production of paint or ink.

The acryloyloxy-terminated polyester of this invention provides a cured product exhibiting excellent adhesion and bending characteristics to TFS and tinplate to which conventional paints and inks cannot be bonded well, as well as to metals such as surface treated steel and aluminum, which could not be attained at all with conventional paints or inks prepared using prior art acryloyloxy-terminated oligomers. The cured product has excellent physical properties such as chemical resistance, elongation, hardness, toughness, water resistance and weather resistance.

Furthermore, the production of the acryloyloxyterminated polyester of this invention does not involve an extremely exothermic reaction as in the urethanation reaction and epoxy esterification reaction, all of the starting materials are easily available, and the reaction procedures are not difficult. Therefore, the acryloyloxyterminated polyester of this invention can be produced easily and economically. This is one of the advantageous features of this invention.

It seems that a compound similar in chemical structure to the acryloyloxy-terminated polyester of this invention can be prepared by reacting a carboxy-terminated polyester comprising the same dicarboxylic acid unit and dihydric alcohol unit as in this invention with a hydroxy group-containing acryloyloxy compound, for example, hydroxyalkyl acrylate, to form an acrylate. This method, however, is not practical for the reasons that the production of a carboxy-terminated polyester, particularly one having a relatively high molecular weight (a high degree of condensation) is difficult, the reaction between the terminal carboxyl and hydroxyl groups resulting from terephthalic acid and isophthalic acid, respectively, does not proceed easily at low temperatures, and at high temperatures such that the above reaction can proceed, thermal polymerization of the acryloyloxy compound tends to occur.

The acryloyloxy-terminated polyester of this invention is cured by a radical-curing technique. When the curing is performed by irradiation with ultraviolet light, a photoinitiator and an accelerator are used as a polymerization initiator.

Photoinitiators which can be used industrially include benzoin alkyl ether, benzophenone, benzil, N,N'-diethylaminobenzophenone, methyl orthobenzoylbenzoate, 2,2-diethoxyacetophenone, 2,2-dimethoxy-2-phenylacetophenone, 2-alkylthioxanthone, chlorothioxanthone, 1-phenyl-1,2-propanedionoxime, chlorinated acetophenone derivatives and the like. These compounds are well-known in the art.

Examples of accelerators which can be used include primary-, secondary- or tertiary-amines such as mono-, di- or tri-ethanolamine, ethyl-4-dimethylamino benzoate, and 2-(dimethylamino) benzoate.

These photoinitiators and accelerators can be used in the curing of the acryloyloxy-terminated polyester of this invention, and they are usually added in amounts ranging from about 0.1% by weight to about 10% by weight based on the weight of the polyester.

Where the curing is performed by application of heat, thermal polymerization initiators, such as an organic peroxide (e.g., benzoyl peroxide, di-t-butyl peroxide, etc.), an azo compound (e.g., azobisisobutyronitrile, etc.) and a persulfate (e.g., ammonium persulfate, potassium persulfate, etc.), are used. As a heat source, a heater, far infrared rays, microwaves, etc., can be used. The use of these initiators in combination with redox accelerators permits curing at ordinary temperature.

In addition to the radical-curing technique as described above, a curing technique using the so-called Michael addition reaction between the acryloyloxy group and an active hydrogen compound, such as a polyamine (e.g., ethylenediamine, diethylenetriamine, triethylenetetramine, xylylenediamine, an aliphatic polyamine used as a curing agent for epoxy resins, etc.) and a polythiol (e.g., pentaerythritoltetrakis(thioglycolate), trimethylolpropanetris($\beta$-mercaptopropionate), ethyleneglycoldimercaptopropionate, etc.), can be employed.

The acryloyloxy-terminated polyester of this invention and a composition containing the polyester are liquid, can be cured easily using various curing techniques, and provide an excellent cured product which could not be obtained with conventional acryloyloxy-terminated polyesters. Utilizing these advantages, the acryloyloxy-terminated polyester of this invention can be used in various applications, for example, as a fast-curing paint, a printing ink, a resist ink, an adhesive, a casting material, a potting material, a molding material, and a photosensitive resin.

This invention permits such useful compounds to be produced easily and efficiently.

This invention will be explained in greater detail by reference to the following examples and comparative examples. Of the starting materials used in production of acryloyloxy-terminated polyesters, one of the starting materials for use in the method of this invention, PES-A, PES-B, PES-C and PES-D indicate the following low molecular weight hydroxy-terminated polyesters:

PES-A:
Prepared by reacting 208 g (2 mols) of neopentyl glycol and 146 g (1 mol) of adipic acid for 8 hours at a temperature of 180° C. to 200° C. in the presence of 500 ppm of tetra-n-butyl titanate as a catalyst in a stream of nitrogen gas. The reaction product on the average has the following structure:

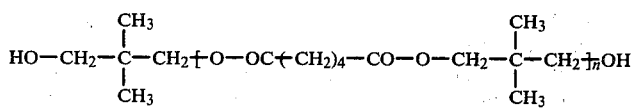

(wherein n=on the average 1).
PES-B:
Prepared by reacting 124 g (2 mols) of ethylene glycol and 146 g (1 mol) of adipic acid in the same manner as used in the preparation of PES-A. The reaction product on the average has the following structure:

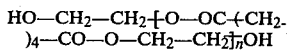

(wherein n=on the average 1).
PES-C:
Prepared by reacting 312 g (3 mols) of neopentyl glycol, 194 g (1 mol) of dimethyl terephthalate and 97 g (0.5 mol) of dimethyl isophthalate in the same manner as in the preparation of PES-A. The reaction product has a structure where the adipic acid unit of PES-A is replaced by terephthalic acid and isophthalic acid units (molar ratio=2:1).
PES-D:
Prepared by reacting 186 g (3 mols) of ethylene glycol, 194 g (1 mol) of dimethyl terephthalate and 97 g (0.5 mol) of dimethyl isophthalate in the same manner as in the preparation of PES-A. The reaction product has a structure where the adipic acid unit of PES-B is replaced by terephthalic acid and isophthalic acid units (molar ratio=2:1).

The symbols used in the tables described hereinafter are as follows:
Dicarboxylic Acid Unit
(Unit)
TP: Terephthalic acid
IP: Isophthalic acid
AD: Adipic acid
DD: Decanedicarboxylic acid
(Starting Material)
DMT: Dimethyl terephthalate
DMI: Dimethyl isophthalate
ADA: Adipic acid
DDA: Decanedicarboxylic acid
Dihydric Alcohol Unit
(Unit)
EG: Ethylene glycol unit
NPG: Neopentyl glycol unit
BD: 1,4-Butanediol unit
DG: Diethylene glycol unit
PTG: Polytetramethylene glycol unit
(Starting Material)
EGL: Ethylene glycol
NPGL: Neopentyl glycol
BDL: 1,4-Butanediol
DGL: Diethylene glycol
PTGL: Polytetramethylene glycol (molecular weight: 850)

The dicarboxylic acid unit and dihydric alcohol unit contents of the hydroxy-terminated polyester were determined by analyzing effluent (composed mainly of the dihydric alcohol) by high-speed liquid chromatography to measure the amount of each component in the effluent and then by subtracting the value so obtained from the amount of the component contained in the feed. It has been confirmed that the thus-obtained values are in agreement with those obtained by NMR spectrum analysis within the error range that is allowable as an error in measurement.

The molecular weight of the hydroxy-terminated polyester was measured by high-speed liquid chromatography with Model HLC-801 A (produced by Toyo Soda Manufacturing Co., Ltd.). It has also been confirmed that the value so obtained is in substantial agreement with that determined from the analytical value of OH measured by the acetic anhydride-pyridine method.

The physical properties of the cured product of the acryloyloxy-terminated polyester were measured using an about 1 mm thick film which was obtained by irradiating a composition of 100 parts by weight of acryloyloxy-terminated polyester and 2 parts by weight of benzil or benzophenone as a photoinitiator, with ultraviolet light for 12 minutes at a distance of 30 cm below a National High-Pressure Mercury Lamp (H-2000 TQ, 30 W/cm). The tensile strength and rate of elongation of the crued product were measured using a No. 2 dumbell test piece at a tensile rate of 10 mm/min.

The constitution and molecular weight of the hydroxy-terminated polyester used in each example are shown in Table 1 below, and the characteristics of the acryloyloxy-terminated polyester and the physical properties of the cured product are shown in Table 2 below.

EXAMPLES 1 and 2, AND COMPARATIVE EXAMPLE 1

A mixture of 100 g of dimethyl terephthalate, 100 g of dimethyl isophthalate, 37.6 g of adipic acid, 79.9 g of ethylene glycol, 134 g of neopentyl glycol, and 0.3 g of tetra-n-butyl titanate as a catalyst was placed in a glass reactor and reacted for 14 hours while introducing nitrogen gas thereinto with stirring and gradually increasing the temperature from 150° C. to 190° C. Subsequently, the mixture was vacuum-polycondensed under reduced pressure at a temperature of 190° C. while removing the alcohol formed.

In a glass reactor was placed 90 to 120 g of each of three hydroxy-terminated polyesters removed from the above reaction 1 hour, 2.5 hours and 3.5 hours after the start of the vacuum-polycondensation (referred to as No. 1, No. 2 and No. 3, respectively). Then, 0.2 g of sulfuric acid, 0.06 g of methyl hydroquinone and acrylic acid were added thereto so that the equivalent ratio of hydroxyl group to carboxyl group (OH/COOH) was 1:1.1, and furthermore 130 g of toluene was added.

The toluene was refluxed for 7 hours at the reflux temperature (120° to 130° C.) of toluene to withdraw the water formed by esterification from the reaction system as an azeotropic mixture with toluene, so that the hydroxy group of the hydroxy-terminated polyester was converted into an acrylate.

Thereafter, by removing the toluene at a temperature of 60° to 80° C. by vacuum distillation, three corresponding acryloyloxy-terminated polyesters was obtained.

EXAMPLES 3 to 5

A mixture of 100 g of dimethyl terephthalate, 100 g of dimethyl isophthalate, 108.1 g of PES-A, 85.3 g of ethylene glycol and 1.5 g of neopentyl glycol was reacted for 6 hours while gradually increasing the temperature from 150° C. to 190° C. in the same manner as in Examples 1 and 2. Subsequently, the mixture was vacuum-polycondensed for a predetermined time under reduced pressure at a temperature of 190° C. while removing the alcohol formed.

Three hydroxy-terminated polyesters obtained 2 hours, 3.5 hours and 4.8 hours after the start of the vacuum-polycondensation (referred to as No. 4, No. 5 and No. 6, respectively) were processed in the same manner as described in Examples 1 and 2 to obtain three corresponding acryloyloxy-terminated polyesters.

EXAMPLES 6 to 8

A mixture of 150 g of dimethyl terephthalate, 50 g of dimethyl isophthalate, 80.2 g of PES-B, 46.9 g of ethylene glycol and 150 g of neopentyl glycol was reacted for 6 hours while gradually increasing the temperature from 150° C. to 190° C. in the same manner as described in Examples 1 and 2. Subsequently, the mixture was vacuum-polycondensed under reduced pressure at a temperature of 190° C. while removing the alcohol formed.

Three hydroxy-terminated polyesters obtained 2 hours, 3 hours and 4 hours after the start of the vacuum-polycondensation (referred to as No. 7, No. 8 and No. 9, respectively) were processed in the same manner as described in Examples 1 and 2 to obtain three corresponding acryloyloxy-terminated polyesters.

EXAMPLES 9 to 12

In the same manner as in Examples 1 to 5, hydroxy-terminated polyesters were prepared and then acrylated to form acryloyloxy-terminated polyesters. The type and amount of the starting materials used in the production of the hydroxy-terminated polyesters, and the reaction time are shown in the table below. In this reaction, 0.2 g of tetra-n-butyl titanate was used as a catalyst.

In the column headed "Polycondensation Time" in the table, "First Stage" indicates the stage in which the reaction is carried out while introducing nitrogen gas and gradually increasing the temperature from 150° C. to 190° C., and "Second Stage" indicates the stage in which subsequent to First Stage, vacuum-polycondensation is carried out under reduced pressure at a temperature of 190° C. while removing the alcohol formed.

| Type of Hydroxy-Terminated Polyester No. | Type and Amount (g) of Starting Material | | | | | | | Polycondensation Time (hr) | |
|---|---|---|---|---|---|---|---|---|---|
| | DMT | DMI | ADA | PES-A | EGL | NPGL | BDL | First Stage | Second Stage |
| 10 | 60 | 60 | 34.7 | — | 54.3 | 37.8 | — | 10 | 3.3 |
| 11 | 60 | 60 | 34.7 | — | 27.2 | 83.3 | — | 10 | 5.0 |
| 12 | 90 | 30 | — | 34.7 | 54.1 | 37.8 | — | 8 | 3.7 |
| 13 | 96.6 | 32.2 | — | 90.5 | — | 39.5 | 85.4 | 8 | 4.0 |

EXAMPLES 13 TO 17

Hydroxy-terminated polyesters were prepared using the starting materials and under the conditions as indicated in the table below, in the same manner as in Examples 1 to 5, and were acrylated in the same manner as in Examples 1 and 2 to obtain corresponding acryloyloxy-terminated polyesters.

The terms "First Stage" and "Second Stage" in the table below are the same as described in Examples 9 to 12.

| Type of Hydroxy-Terminated Polyester No. | Type and Amount (g) of Starting Material | | | | | | | Polycondensation Time (hr) | |
|---|---|---|---|---|---|---|---|---|---|
| | DMT | DDA | PES-C | PES-D | EGL | NPGL | PTGL | First Stage | Second Stage |
| 14 | 200 | 59.3 | — | — | 84 | 140.1 | 25.3 | 11.5 | 4 |
| 15 | — | — | 135.2 | 101.5 | — | — | 25.3 | — | 3.5 |
| 16 | — | — | 135.2 | 101.5 | — | — | 25.3 | — | 4.5 |
| 17 | — | — | 121.7 | 91.4 | — | — | 45.6 | — | 2.5 |
| 18 | — | — | 121.7 | 91.4 | — | — | 45.6 | — | 3.8 |

EXAMPLES 18 TO 20

Methacryloyloxy-terminated polyesters were prepared from hydroxy-terminated polyesters No. 5, No. 14 and No. 16 in the same manner as in Examples 1 and 2 with the exception that methacrylic acid was used in place of acrylic acid.

COMPARATIVE EXAMPLES 2 TO 5

Hydroxy-terminated polyesters were prepared from the starting materials and under the conditions as indicated in the table below in the same manner as in Examples 1 and 2, and then were acrylated in the same manner as in Examples 1 and 2 to form the corresponding acryloyloxy-terminated polyesters.

The terms "First Stage" and "Second Stage" are the same as described in Examples 9 to 12, but the polycondensation temperatures employed are different as indicated in the table.

| Type of Hydroxy-Terminated Polyester No. | Type and Amount (g) of Starting Material | | | | | | | Polycondensation Conditions | | | |
|---|---|---|---|---|---|---|---|---|---|---|---|
| | | | | | | | | First Stage | | Second Stage | |
| | DMT | DMI | ADA | DDA | EGL | DGL | NPGL | Temperature (°C.) | Time (hr) | Temperature (°C.) | Time (hr) |
| 19 | 80 | — | — | — | — | 87.4 | — | 200 | 3 | 200 | 3 |
| 20 | 70 | — | — | 9.2 | 26.1 | — | 43.8 | 150–200 | 6 | 200 | 3 |
| 21 | 77.6 | 19.4 | — | — | 62 | — | — | 150–200 | 6 | 190 | 2.5 |
| 22 | — | — | 73 | — | — | — | 104 | 180–200 | 8 | 190 | 3 |

TABLE 1

Constitution and Molecular Weight of Hydroxy-Terminated Polyesters

| Type of Hydroxy-Terminated Polyester No. | Dicarboxylic Acid Unit (mol %) | | | | Dihydric Alcohol Unit (mol %) | | | | | Molecular Weight |
|---|---|---|---|---|---|---|---|---|---|---|
| | TP | IP | AD | DD | EG | NPG | BD | PTG | DG | |
| 1 | 40 | 40 | 20 | — | 46 | 54 | — | — | — | 350 |
| 2 | " | " | " | — | 40 | 60 | — | — | — | 880 |
| 3 | " | " | " | — | 39 | 61 | — | — | — | 1,280 |
| 4 | 37.5 | 37.5 | 25 | — | 42 | 58 | — | — | — | 640 |
| 5 | " | " | " | — | 39 | 61 | — | — | — | 1,360 |
| 6 | " | " | " | — | 36 | 64 | — | — | — | 3,200 |
| 7 | 56 | 19 | " | — | " | " | — | — | — | 400 |
| 8 | " | " | " | — | 32 | 68 | — | — | — | 880 |
| 9 | " | " | " | — | 30 | 70 | — | — | — | 1,120 |
| 10 | 42.5 | 42.5 | 15 | — | 46 | 52 | — | — | — | 4,000 |
| 11 | " | " | " | — | 19 | 81 | — | — | — | 1,160 |
| 12 | 64 | 21 | " | — | 47 | 53 | — | — | — | 4,800 |
| 13 | 52 | 18 | 30 | — | — | 40 | 60 | — | — | 920 |
| 14 | 80 | — | — | 20 | 38 | 62 | — | — | — | 1,360 |
| 15 | 67 | 33 | — | — | 41 | 56 | — | 3 | — | 720 |
| 16 | " | " | — | — | 37 | 60 | — | " | — | 1,640 |
| 17 | " | " | — | — | 38 | 56 | — | 6 | — | 840 |
| 18 | " | " | — | — | 33 | 61 | — | " | — | 3,400 |
| 19 | 100 | — | — | — | — | — | — | — | 100 | 1,480 |
| 20 | 90 | — | — | 10 | 36 | 64 | — | — | — | 4,400 |
| 21 | 80 | 20 | — | — | 100 | — | — | — | — | 1,100 |
| 22 | — | — | 100 | — | — | 100 | — | — | — | 1,000 |

TABLE 2

Properties of Acryloyloxy-Terminated Polyesters and Physical Properties of Cured Products

| Example | Type of Hydroxy-Terminated Polyester No. | Properties | Type of Acryloyloxy Group | Physical Properties of Cured Product | | | |
|---|---|---|---|---|---|---|---|
| | | | | Shore Hardness | Tensile Strength (kg/cm$^2$) | Elongation (%) | 180° Bending |
| Comparative Example 1 | 1 | Liquid of low viscosity | Acryloyloxy | D-77 | 260 | 7 | Cracking in entire surface |
| Example 1 | 2 | Liquid of moderate viscosity | " | D-27 | 30 | 85 | No cracking |
| Example 2 | 3 | Liquid of moderate viscosity | " | D-43 | 50 | 95 | " |
| Example 3 | 4 | Liquid of moderate viscosity | " | D-45 | 90 | 55 | " |
| Example 4 | 5 | Liquid of moderate viscosity | " | D-39 | 70 | 90 | " |
| Example 5 | 6 | Liquid of high viscosity | " | D-19 | 20 | 125 | " |
| Example 6 | 7 | Liquid of low viscosity | " | D-58 | 110 | 30 | Partial cracking |
| Example 7 | 8 | Liquid of moderate viscosity | " | D-50 | 70 | 50 | No cracking |
| Example 8 | 9 | Liquid of moderate viscosity | " | D-40 | 90 | 70 | " |
| Example 9 | 10 | Wax of high viscosity | " | D-63 | 150 | 90 | " |

TABLE 2-continued
Properties of Acryloyloxy-Terminated Polyesters and Physical Properties of Cured Products

| Example | Type of Hydroxy-Terminated Polyester No. | Properties | Type of Acryloyloxy Group | Physical Properties of Cured Product | | | |
|---|---|---|---|---|---|---|---|
| | | | | Shore Hardness | Tensile Strength (kg/cm$^2$) | Elongation (%) | 180° Bending |
| Example 10 | 11 | Liquid of moderate viscosity | " | D-54 | 70 | 100 | " |
| Example 11 | 12 | Liquid of high viscosity | " | D-28 | 22 | 135 | " |
| Example 12 | 13 | Liquid of moderate viscosity | " | D-30 | 85 | 40 | " |
| Example 13 | 14 | Liquid of moderate viscosity | " | D-42 | 54 | 75 | " |
| Example 14 | 15 | Liquid of moderate viscosity | " | D-55 | 170 | 20 | " |
| Example 15 | 16 | Liquid of moderate viscosity | " | A-55 | 15 | 155 | " |
| Example 16 | 17 | Liquid of moderate viscosity | " | A-75 | 60 | 65 | " |
| Example 17 | 18 | Liquid of high Viscosity | " | A-45 | 8 | 100 | " |
| Example 18 | 5 | Liquid of moderate viscosity | Methacryloyloxy | D-55 | 110 | 50 | " |
| Example 19 | 14 | Liquid of moderate viscosity | Methacryloyloxy | D-50 | 75 | 70 | " |
| Example 20 | 16 | Liquid of moderate viscosity | Methacryloyloxy | D-41 | 65 | 110 | " |
| Comparative Example 2 | 19 | Solid | Acryloyloxy | — | — | — | —(hard and brittle) |
| Comparative Example 3 | 20 | " | " | — | — | — | —(hard and brittle) |
| Comparative Example 4 | 21 | " | " | — | — | — | —(hard and brittle) |
| Comparative Example 5 | 22 | Liquid of low viscosity | " | A-50 | 3 | 15 | Cracking over entire surface |

REFERENCE EXAMPLES 1 TO 5 AND COMPARATIVE REFERENCE EXAMPLES 1 AND 2

To the acryloyloxy-terminated polyesters obtained in Examples 1, 2, 5, 10 and 15 was added 2% by weight of 2,2-dimethoxy-2-phenylacetophenone as a photoinitiator to prepare five compositions.

Each of these compositions was coated in a thickness of about 30μ on a tin-free steel plate (TFS-CT-0.24 mm) or a phosphate-treated steel plate (JIS-G-3141, Bt#144). The plate was then passed three times under a high pressure mercury lamp (ozone and focusing type) with an output of 80 W/cm at a distance of 8 cm in air at a conveyor rate of 5 m/min to irradiate the plate with ultraviolet light and cure the composition coated thereon.

For comparison, in the same manner as described above except that an acryloyloxy-terminated epoxyester (a polycondensate of a bisphenol A-diglycidyl ether type epoxy resin and acrylic acid; molecular weight: about 450) or an acryloyloxy-terminated polyurethane (a polycondensate of polyethylene adipate, tolylene diisocyanate and 2-hydroxyethyl acrylate; molecular weight: about 1,000) was used in place of the acryloyloxy-terminated polyester, two compositions were prepared, each coated on the substrate and cured by irradiation with ultraviolet light.

The physical properties of the thus-formed cured coating films were measured and are shown in the table below.

| Example | Type of Acryloyloxy-Terminated Compound | Physical Properties | | | |
|---|---|---|---|---|---|
| | | Adhesion[*1] | | Bending Test(1T)[*2] | |
| | | Bt#144 | TFS | Bt#144 | TFS |
| Reference Example 1 | Example 1 | 100 | 100 | B | B |
| Reference Example 2 | Example 2 | 100 | 100 | A | A |
| Reference Example 3 | Example 5 | 100 | 100 | A | A |
| Reference Example 4 | Example 10 | 100 | 100 | A | A |
| Reference Example 5 | Example 15 | 100 | 100 | A | A |
| Comparative Reference Example 1 | Acryloyloxy-Terminated Epoxyester | 5 | 0 | C | C |
| Comparative Reference | Acryloyloxy-Terminated | 0 | 0 | C | C |

-continued

| Example | Type of Acryloyloxy-Terminated Compound | Physical Properties | | | |
|---|---|---|---|---|---|
| | | Adhesion*1 | | Bending Test(1T)*2 | |
| | | Bt# 144 | TFS | Bt# 144 | TFS |
| Example 2 | Polyurethane | | | | |

*1Residual ratio (%) of the cured coating film on the steel plate when a pressure-sensitive adhesive tape is adhered to the cured coating film spoiled with a knife to make 100 squares (1 mm × 1 mm) in a 10 mm × 10 mm square, and then peeled apart.
*2A: No cracking or stripping of coating film
B: Slight cracking of coating film
C: Large amount of cracking and stripping of coating film While the invention has been described in detail and with reference to specific embodiments thereof, it will be apparent to one skilled in the art that various changes and modifications can be made therein without departing from the spirit and scope thereof.

What is claimed is:

1. A process for producing an acryloyloxy- or methacryloyloxy-terminated polyester which comprises reacting a hydroxy-terminated polyester with acrylic acid or methacrylic acid, said hydroxy-terminated polyester comprising (a) a dicarboxylic acid unit comprising about 10 to about 80 mol% of a terephthalic acid unit and about 90 to about 20 mol% of another dicarboxylic acid unit and (b) a dihydric alcohol unit containing about 30 mol% or more of a dihydric alcohol unit containing 3 or more carbon atoms, and having a number average molecular weight of about 400 to about 5,000.

2. The process as in claim 1, wherein the dicarboxylic acid unit comprises about 10 to about 80 mol% of a terephthalic acid unit, about 10 to about 80 mol% of an isophthalic acid unit and/or a saturated dicarboxylic acid unit containing 4 or more carbon atoms, and 0 to about 50 mol% of another dicarboxylic acid unit.

3. The process as in claim 2, wherein the dicarboxylic acid unit contains both the isophthalic acid unit and the saturated dicarboxylic acid unit containing 4 or more carbon atoms, the molar ratio of the isophthalic acid unit to the terephthalic acid unit is about 0.3:1 to about 3:1, and the molar ratio is the saturated dicarboxylic acid unit containing 4 or more carbon atoms to the total amount of the terephthalic acid unit and the isophthalic acid unit is about 1/9:1 to about 1:1.

4. The process as in claim 1, wherein said dihydric alcohol unit containing 3 or more carbon atoms is a unit derived from 1,3-propylene glycol, 1,2-propylene glycol, 1,4-butanediol, 1,3-butanediol, or 2,3-butanediol, 1,6-hexanediol, neopentyl glycol, diethylene glycol, polyethylene glycol, dipropylene glycol, polypropylene glycol, ditetramethylene glycol, polytetramethylene glycol, polyoxyethylenated bisphenol A, polyoxypropylenated bisphenol A, 1,4-dihydroxy-2-ethylbutane, 1,8-dihydroxyoctane, 2,10-dihydroxydecane, 1,4-dihydroxycyclohexane, 1,4-dimethylolcyclohexane, 2,2-diethyl-propanediol-1,3, 2,2-dimethyl-propanediol-1,3, 3-methyl-pentanediol-1,4, 2,2-diethyl-butanediol-1,3, 4,5-dihydroxynonane, pentamethylene glycol, heptamethylene glycol, nonamethylene glycol, decamethylene glycol, 2-ethylhexanediol-1,3, triethylene glycol, tetraethylene glycol, tripropylene glycol or tetrapropylene glycol.

5. The process as in claim 2, wherein said saturated dicarboxylic acid unit containing 4 or more carbon atoms is an acid unit derived from succinic acid, glutaric acid, adipic acid, sebacic acid, decanedicarboxylic acid, 1,4-cyclohexanedicarboxylic acid, 1,3-cyclohexanedicarboxylic acid, 1,2-cyclohexanedicarboxylic acid, an acid anhydride thereof or a lower alkyl ester thereof.

6. The process as in claim 2, wherein said another dicarboxylic acid unit is a dicarboxylic acid unit derived from maleic acid, fumaric acid or phthalic acid.

* * * * *